Patented May 29, 1923.

1,456,557

UNITED STATES PATENT OFFICE.

KARL IMHOFF, OF ESSEN, GERMANY.

CLEARING PLANT WITH SLUDGE DECOMPOSITION.

Application filed August 14, 1922. Serial No. 581,910.

*To all whom it may concern:*

Be it known that I, KARL IMHOFF, a citizen of the German Republic, and residing at Essen, Germany, have invented certain new and useful Improvements in Clearing Plants with Sludge Decomposition, of which the following is a specification.

In clearing plants working with sludge decomposition, the digestion process depends largely upon the temperature of the sludge. This applies particularly to the ripening time. The most favourable temperature for the methane putrefaction is about 35° centigrade. In wintertime, the putrefaction decreases considerably. It even may happen that the putrefaction in the digestion chamber ceases completely during wintertime and that the digestion chamber must run through a fresh ripening time early in the year.

To improve the putrefaction in digestion chambers, it is thus recommended to keep at least one of the digestion chambers belonging to a clearing plant at an increased temperature favourable for the methane putrefaction, by means of a special construction and a separate heat supply, e. g., to arrange the same as a hatching or inoculating chamber for the ferments of the methane putrefaction. The good sludge of this hatching chamber can then be used for improving a disturbed sludge digestion during the ripening as well as during the succeeding time. Owing to the sludge in the hatching chamber being warm, it forms also an excellent medium for heating other digestion chambers, which have become too cold in wintertime, by leading the warm sludge into said chambers.

Figure 1:
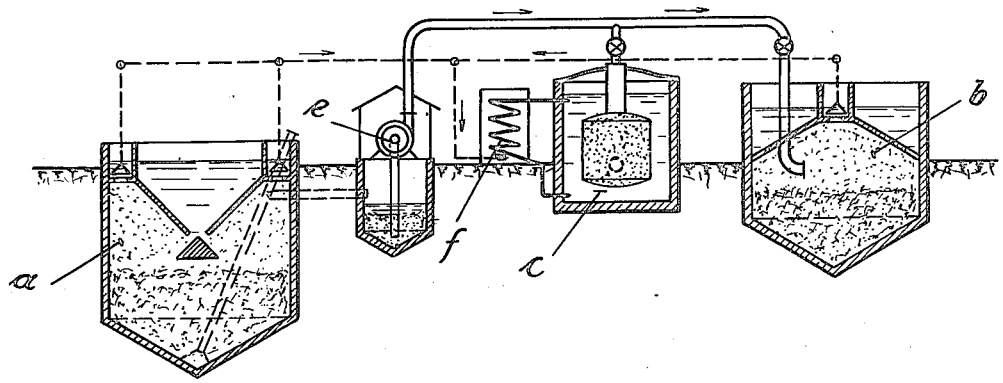

The accompanying drawing shows how the invention can be put into practice; Fig. 1 being a sectional front view, and Fig. 2 a plan view, of the improved clearing plant.

Figure 2:
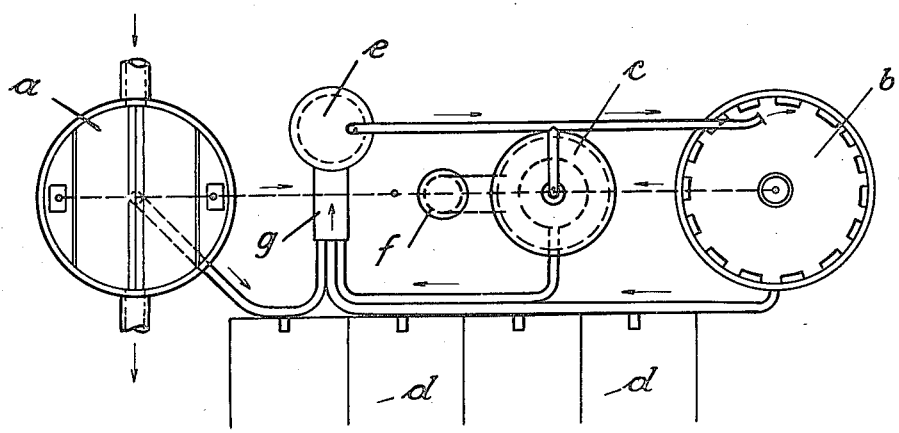

The plant comprises an Imhoff tank $a$, a separate sludge digestion chamber $b$, and a hatching chamber $c$ for the sludge. The digested sludge from the Imhoff tank and the separate sludge digestion chamber, is dried on sludge drying places $d$ (Fig. 2). A pump $e$ serves for supplying the sludge from the Imhoff tank to the separate sludge digestion chamber, or to the hatching chamber respectively.

The hatching chamber $c$ is formed of a closed vessel submerged in a water bath. The water surrounding the vessel is heated to the desired temperature by means of a heating coil $f$ or the like, preferably by a combustion of the methane gained from the sludge in $a$ and $b$.

In order to attain an effective utilization of the sludge of the hatching chamber $c$ enriched with ferments of the methane putrefaction, it must be intimately mixed with the sludge to be improved. This is effected by letting-off from the hatching chamber $c$ and the Imhoff tank $a$, or the digestion chamber $b$ respectively, an exactly controllable quantity of sludge and leading the same to the pump $e$, the sludge passing on this way preferably through a mixing gutter $g$. From the pump, the sludge mixed is raised into the Imhoff tank or the separate chamber for further decomposition.

What I claim, is:—

1. A method of decomposing waste-water sludge in digestion chambers, consisting in keeping part of the sludge for some time in a separate hatching chamber at an increased temperature favourable for the methane putrefaction, and then mixing the same with the other sludge, substantially as and for the purpose set forth.

2. A method of decomposing waste-water sludge in digestion chambers, consisting in keeping part of the sludge for some time in a separate hatching chamber at an increased temperature favourable for the methane putrefaction, while using the own gases of the sludge for heating said chamber, and then mixing the warm sludge with the other sludge, substantially as and for the purpose set forth.

In testimony whereof I have hereunto set my hand in the presence of two subscribing witnesses.

DR. KARL IMHOFF.

Witnesses:
 S. F. K. STEPHAN,
 ANNIE STEPHAN.